US010585018B2

(12) United States Patent
Willing

(10) Patent No.: US 10,585,018 B2
(45) Date of Patent: Mar. 10, 2020

(54) METHOD AND ARRANGEMENT FOR THE DETECTION OF MISFIRE OF INTERNAL COMBUSTION ENGINES

(71) Applicant: RÜEGER S.A., Crissier (CH)

(72) Inventor: Bert Willing, Blonay (CH)

(73) Assignee: RÜEGER S.A., Crissier (CH)

( * ) Notice: Subject to any disclaimer, the term of this patent is extended or adjusted under 35 U.S.C. 154(b) by 209 days.

(21) Appl. No.: 15/643,957

(22) Filed: Jul. 7, 2017

(65) Prior Publication Data

US 2018/0010983 A1    Jan. 11, 2018

(30) Foreign Application Priority Data

Jul. 11, 2016  (EP) ................................. 16178815

(51) Int. Cl.
*G01M 15/11*    (2006.01)
*F02D 41/22*    (2006.01)
(Continued)

(52) U.S. Cl.
CPC ........... *G01M 15/11* (2013.01); *F01N 13/008* (2013.01); *F01N 13/08* (2013.01);
(Continued)

(58) Field of Classification Search
CPC .... G01M 15/11; F02D 41/1498; F02D 41/22; F02D 41/1448; F02D 41/1447;
(Continued)

(56) References Cited

U.S. PATENT DOCUMENTS 4,215,575 A * 8/1980 Akita .................... G01K 11/24
374/119
6,481,287 B1 * 11/2002 Ashworth .............. G01K 11/24
374/117
(Continued)

FOREIGN PATENT DOCUMENTS

DE      43 43 855 A1    7/1995
DE       4343855 A1 *   7/1995 ............... F23G 5/50
(Continued)

OTHER PUBLICATIONS

Extended European Search Report dated Jan. 16, 2017 for corresponding European Application No. EP 16 178 815.3.
(Continued)

*Primary Examiner* — Freddie Kirkland, III
(74) *Attorney, Agent, or Firm* — Renner, Otto, Boisselle & Sklar, LLP

(57) ABSTRACT

A method and system are provided with which it is possible to detect non-firing and untimely firing events in internal combustion and, if necessary, the temperature of the gas in the exhaust gas pipe. This is performed in general by measuring the speed of sound and determining the phase angle between the sender and receiver either arranged on different sides of the exhaust gas pipe or on the same side of the exhaust gas pipe. The receiver, depending on the measurement principle, can include one, two, or in special applications three receivers. Additionally, if necessary, it is possible to suppress the structure-borne sound influence on a speed of sound measurement with low cost and high stability.

12 Claims, 3 Drawing Sheets

(51) Int. Cl.
  *F02D 41/14* (2006.01)
  *G01K 13/02* (2006.01)
  *G01K 11/24* (2006.01)
  *F01N 13/00* (2010.01)
  *F01N 13/08* (2010.01)

(52) U.S. Cl.
  CPC ..... *F02D 41/1447* (2013.01); *F02D 41/1448* (2013.01); *F02D 41/1498* (2013.01); *F02D 41/22* (2013.01); *G01K 11/24* (2013.01); *G01K 13/02* (2013.01); *F01N 2560/06* (2013.01); *F01N 2560/12* (2013.01); *F02D 2200/1015* (2013.01); *G01K 2013/024* (2013.01); *G01K 2205/04* (2013.01); *Y02T 10/40* (2013.01)

(58) Field of Classification Search
  CPC ............. F02D 2200/1015; Y02T 10/40; F01N 2560/12; F01N 2560/06; F01N 13/08; F01N 13/008; G01K 2013/024; G01K 2205/04; G01K 13/02; G01K 11/24
  See application file for complete search history.

(56) References Cited

U.S. PATENT DOCUMENTS 7,021,128 B2 * 4/2006 Rauchfuss ............. G01M 15/11
    73/114.07
2004/0003651 A1 * 1/2004 Rauchfuss ............. G01M 15/11
    73/35.07
2018/0011058 A1 * 1/2018 Willing .................. G01N 29/32
2018/0011060 A1 * 1/2018 Willing ................ G01N 29/222

FOREIGN PATENT DOCUMENTS

DE    10 2005 042792 B3    5/2007
DE    10 2006 031081 B3    12/2007
DE    10 2012 205683 A1    10/2013

OTHER PUBLICATIONS

J Yamaga et al: "Measurement of Combustion Gas Temperature of Internal Combustion Engine by Use of Ultrasonic Wave", Bulletin of the JSME, Jan. 1, 1971, pp. 156-163.

Lakshminarayanan P A et al: "Measurement of pulsating temperature and velocity in an internal combustion engine using an ultrasonic flowmeter", Journal of Physics E. Scientific Instruments, IOP Publishing, Bristol, GB, vol. 12, No. 11, Nov. 1, 1979, pp. 1053-1058.

Dadd M W: "Acoustic thermometry in gases using pulse techniques", High Temperature Technology, vol. 1, No. 6.

Dadd M W: "Acoustic thermometry in gases using pulse techniques", High Temperature Technology, vol. 1, No. 6 (1983).

* cited by examiner

METHOD AND ARRANGEMENT FOR THE DETECTION OF MISFIRE OF INTERNAL COMBUSTION ENGINES

CROSS-REFERENCE TO RELATED APPLICATION

This application is based upon and claims the benefit of priority of European Patent Application No. 16 178 815.3, filed on Jul. 11, 2016, the entire content of which is incorporated herein by reference.

TECHNICAL FIELD

The present invention concerns a method and a sensor arrangement for the detection of misfire of internal combustion engines.

BACKGROUND ART

The misfire of internal combustion engines is a much undesired event in view of environment regulations and engine damages. Non-firing has adverse effects for the downstream filter and/or catalyst because the fuel is then burned there and damages the catalysts and/or filter, and premature or late ignitions lead to increased emission levels and increased consumption of fuel.

In view of that there is a need to propose a method and a sensor arrangement to detect misfire. Therefore it is an object of the invention to provide a method and arrangement which allows the detection of misfire of an internal combustion engine with high accuracy and with relatively low costs.

This object is solved by the method and sensor arrangement described herein.

SUMMARY

According to the invention the speed of sound variations of the exhaust gas in an exhaust gas pipe of the engine are measured as a function of time. The measurement of the speed of sound across an engine exhaust gas pipe enables extremely fast measurement, with temporal resolutions on the order of single milliseconds. During the operation of the engine, the state of the gas cycles between high temperature/high humidity when the combustion products travel down the pipe, and low temperature/low humidity in the absence of combustion products.

As the speed of sound increases with both, the temperature and the humidity content of the gas, a fast measurement of the speed of sound across the exhaust gas pipe will therefore clearly indicate each combustion cycle with high temporal resolution. For example, on a 4 cylinder 4-stroke engine, there are two combustion cycles per revolution, which yields a combustion cycle length $t_c$ and a combustion cycle frequency as $$t_c = 120/(\text{rpm} \cdot N) \text{ and } f_c = (\text{rpm} \cdot N)/120,$$

where N is the number of cylinders of the engine. For a 6-cylinder truck engine running at 3000 rpm, $f_c$=150 Hz. Averaging for example an ultrasonic signal of 60 kHz over 10 periods will yield a temporal resolution of 1/40 of the combustion cycle length.

As the temperature variations in the pipe span up to several hundred degrees centigrade, and the variations in absolute humidity are typically 10-20%, the temporal variations of the speed of sound are very high so that the firing of a cylinder, and subsequently its non-firing, are very distinctively detected. Due to the high temporal resolution of the measurement, also a misfire (as in too early or too late firing) can be detected.

The speed of sound measurement can be executed as time-of-flight measurement, or by measuring the phase angle between preferably an ultrasonic sender and receiver. The phase angle is preferred, as it is not dependent on signal amplitude which will be impacted by the soot and the corrosive products contained in the exhaust gas. In a preferred embodiment the sound used for measurement is an ultrasonic sound.

The term misfiring includes non-firing or wrong timing of the firing. For the application of misfire detection, the speed of sound does not need to be an absolute measurement since the relation between the signal peaks obtained at a period with hot gas and a period without gas is significantly large. It is sufficient to determine a relative threshold to the « firing » signal level, below which a cylinder is declared to be non-firing. If the temporal resolution of the speed of sound measurement is high enough, the location in time of the peak value of the speed of sound allows to detect premature or late firing.

According to a preferred embodiment of the invention the method includes providing sound sending means and sound receiving means and either placing the sending means and the receiving means on one side of the pipe, or placing the sending means and the receiving means on different sides of the pipe and determining the speed of sound either from the sound from the sending means traveling twice across the pipe before reaching the receiving means, or, respectively, the sound from the sending means traveling once across the pipe before reaching the receiving means on the other side of the pipe. The sound receiving means may comprise at least one receiver.

In another preferred embodiment the method uses a sound sender as sending means and at least a first sound receiver and a second sound receiver as receiving means, such that the travel distance of the sound provided by the sender to the first receiver is different from the travel distance of the sound provided by the sender to the second receiver. Depending on the application it might be useful to use for example a third sound receiver for providing additional information if necessary and appropriate.

Advantageously the second receiver is arranged near the first receiver in the same direction from the sender thereby providing in general only one measuring section of the sound excited by the sender.

In another embodiment of the invention the sender and/or receiver are placed in one or two, respectively, recessed locations of the gas pipe (i.e. at the end of tubes radially connected and open to the exhaust pipe), so that they can be operated at temperatures significantly lower than that of the exhaust pipe.

Since it is only necessary to detect whether a cylinder has ignited or not, a non-firing is determined as the speed of sound below a defined threshold value. The fact that the measurement is a relative one yields a significant simplification of the sensor calibration.

It is important that the measurement of the speed of sound has a high temporal resolution, so that the gas emissions of each individual cylinder can be resolved. It is of interest not only whether a cylinder has ignited, but also the time of ignition. As mentioned above, there are basically two types of misfire which both should be detected:

Non-firings are bad for the downstream filter and/or catalysts, because the fuel is then burned there and damages the catalysts and/or filter Premature or late ignitions lead to increased emission levels and increased consumption of fuel.

In a refinement of the method and sensor arrangement, the speed of sound values undergo at first a time-resolved analysis of misfire, and then in parallel an integration over time (on the order of seconds). Via this second measurement channel the average exhaust gas temperature can be measured, by assuming that the gas composition is reasonably constant. That is an important additional benefit—and could replace presently installed temperature sensors for the exhaust gas. In view of that, according to another embodiment of the invention, the method comprises determining misfiring as a change of the speed of sound in the exhaust gas in dependence of time and then determining the temperature of the exhaust gas, and in the sensor arrangement the signal processing means additionally average the phase angle of the signals of the receiver and calculate the gas temperature.

The respective sensor arrangement according to the invention which is adapted to detect misfire of internal combustion engines, comprises sound sending means and sound receiving means either arranged all on one side of the exhaust pipe of the combustion engine or sound sending means and sound receiving means on different sides of the pipe and a signal processing unit adapted to determine the speed of sound either from the sound from the sending means traveling twice across the pipe before reaching the receiving means, or, respectively, the sound from the sending means traveling once across the pipe before reaching the receiving means on the other side of the pipe, and to detect misfiring depending on whether the speed of sound during the exhaust cycle is below a defined threshold value and/or has the correct timing. In general the receiving means can comprise one, two, or if appropriate three receivers. The applications of the different number of receiver and the advantages have been discussed already above.

According to a further embodiment of the arrangement according to the invention the sound sending means comprise one sound sender and the sound receiving means comprise at least one sound receiver, wherein at least a first sound receiver and a second sound receiver, are arranged such that the travel distance of the sound provided by the sender to the receivers is different to each of the at least first and second receiver.

Preferably, the signal processing means determine the phase angles of the signals. In case of only one sound receiver the determination of the speed of sound can be defined by the phase angle between the sender and the receiver, and in case of the first and the second receivers the speed of sound is based on the phase angles of the two receivers. These phase angles are compared with a threshold value in order to declare non-firing or not. The signal processing means also determine delay or premature of firing events.

For the detection of misfire it might be necessary in case of the above described application with one sender and one receiver to arrange both onto one common structure in order to achieve the small building unit in form of self-contained sensor. In such a case it is the problem that the common structure will transmit part of the sound energy directly from the sender to the receiver, without passing through the measurement gas. Due to the large speed of sound in solids, especially metals, the wavelength of sound in solids is about one order of magnitude larger than in gas, so that the sound travelling via the structure has a different phase angle at the receiver than the sound traveling by the gas. Typically, the variation of the speed of sound with temperature in a solid is relatively small compared to the speed of sound in a gas, and is of the opposite sign.

As both the structure-borne and the gas-borne sound are of the same frequency, the receiver will produce a signal of which the amplitude and phase are composed of both components. Without additional information, it is therefore not possible to separate the gas-borne signal.

As long as the structure-borne amplitude is less than a few percent of the total sound amplitude at the receiver, its effect on the quality of the measurement is low. However, notably when both transducers are mounted close together in parallel, the amplitude of the structure-borne sound is significant. It can be reduced by mechanical means, i.e. a construction of the structure which limits and/or damps sound transmission. However, such a mechanical solution is expensive and/or poses problems at elevated temperatures.

In view of that, additionally the sender can be operated during a least one period of time in an "on"-status by sending an acoustical signal and during at least one period of time in an "off"-status without sending an acoustical signal. Then, the receiver is operated in an "off"-status during at least one period of time of the "on"-status of the sender and in an "on"-status during at least one period of time of the "off"-status of the sender and finally the signal of the receiver is integrated by an amplifier, which calculates the speed of sound and determines, if required, based on the speed of sound the temperature of the gas.

The common structure in general can be made of any solid material which provides a speed of sound which is higher than the speed of sound in the gas. This requirement is fulfilled especially by metal. A preferred material is steel, which has as speed of sound of approximately 4,000 m/s. By operating the sender in the above mentioned "on"-status whereas at the same time the receiver operates in an "off"-status and vice versa the gas-borne and the structure-borne contributions can be separated in time. In view of the different speeds of sound in the different materials, for example, the sender is operated during a first period, while the input from the receiver to the amplifier is switched off. During the next period, which can be different in the duration from the first period, the sender is switched off while the signal of the receiver is measured by the amplifier. As the last structure-borne sound will reach the receiver depending on the speed of sound almost immediately after the sender has been switched off, the structure-borne contribution to the receiver signal will be reduced to a certain amount which depends on the kind of material and the arrangement of sender and receiver. The structure-borne contribution can be reduced further by introducing a delay of some few microseconds between switching off the sender, and switching on the receiver. Such a delay might be necessary if internal reflections of the sound within the structure delay the transition time of the structure-borne sound.

As the overall noise level of the measurement strongly depends on over how many signal oscillations the amplifier can integrate, the "on" time of the receiver should correspond to the time of travel of the gas-borne sound. For the same reason, the "on" time of the sender should span the same amount of time, so that the duty cycles of sender and receiver are both 50% with a phase shift of 7C. With a lock-in amplifier it is possible to integrate the receiver signal continuously over extended periods of time. The amplitude measured by the lock-in amplifier will be half of a continuous signal, whereas the phase angle information is entirely maintained. In this case, the reference channel between the function generator driving the sender and the lock-in amplifier must be open all the time.

The duration of the "on"-status of the receiver corresponds to the travel time of the sound through the gas. The travel time of the sound depends on the distance the sound has to travel between the sender and the receiver and the speed of sound in the gas. By having an "on"-status which corresponds to the travel time an optimal amount of the signal is available for further determination. Respectively, it is advantageous if the duration of the "on"-status of the sender corresponds to the travel time of the sound through the gas.

Further, according to another embodiment, the duty cycle in the "on"-status of the receiver and the "on"-status of the sender is maintained with the same amount of time for obtaining optimal determination conditions with duty cycles of sender and receiver both being 50% with a phase shift of 7C.

As mentioned above with the amplifier it is possible to integrate the signal of the receiver over a number of switching periods. In a preferred embodiment the signal of the receiver is integrated by the amplifier over extended periods of time.

In order to come to the separation in time which allows determination of the difference of the speed of sound with high resolution, the mechanical structure should have a speed of sound being at least five times, preferably ten times, faster than the speed of sound in the gas.

In the present application the sender and the receiver are arranged on that structure such that the sound emitted by the sender reaches the receiver via an acoustical reflector which is the other wall of the exhaust gas pipe. This provides a significantly shorter travel path of the structure-borne sound. This is further supported by arranging the sender and the receiver according to a further preferred embodiment within a distance of less than 10 mm preferably in the region of 4 mm.

With the present invention it is therefore possible to detect misfire in internal combustion engines and additionally the invention allows to detect the point of time of misfire and, if necessary, the temperature of the gas in the exhaust gas pipe. This is performed in general by measuring the speed of sound and determining the phase angle between the sender and the receiver, thereby using sending means and receiving means either arranged on different sides of the exhaust gas pipe or on the same side of the exhaust gas pipe. The receiving means, depending on the measurement principle, can comprise one, two, or in special applications, three receivers. Additionally, if necessary, it is possible to suppress the structure-borne sound influence on a speed of sound measurement with low cost and high stability.

In the following, embodiments of the invention are described in detail in connection with the drawings. However, the invention is not limited to the examples described in connection with the drawings and includes all embodiments covered by the claims and the description alone or in connection with each other.

DETAILED DESCRIPTION

Figure 1:
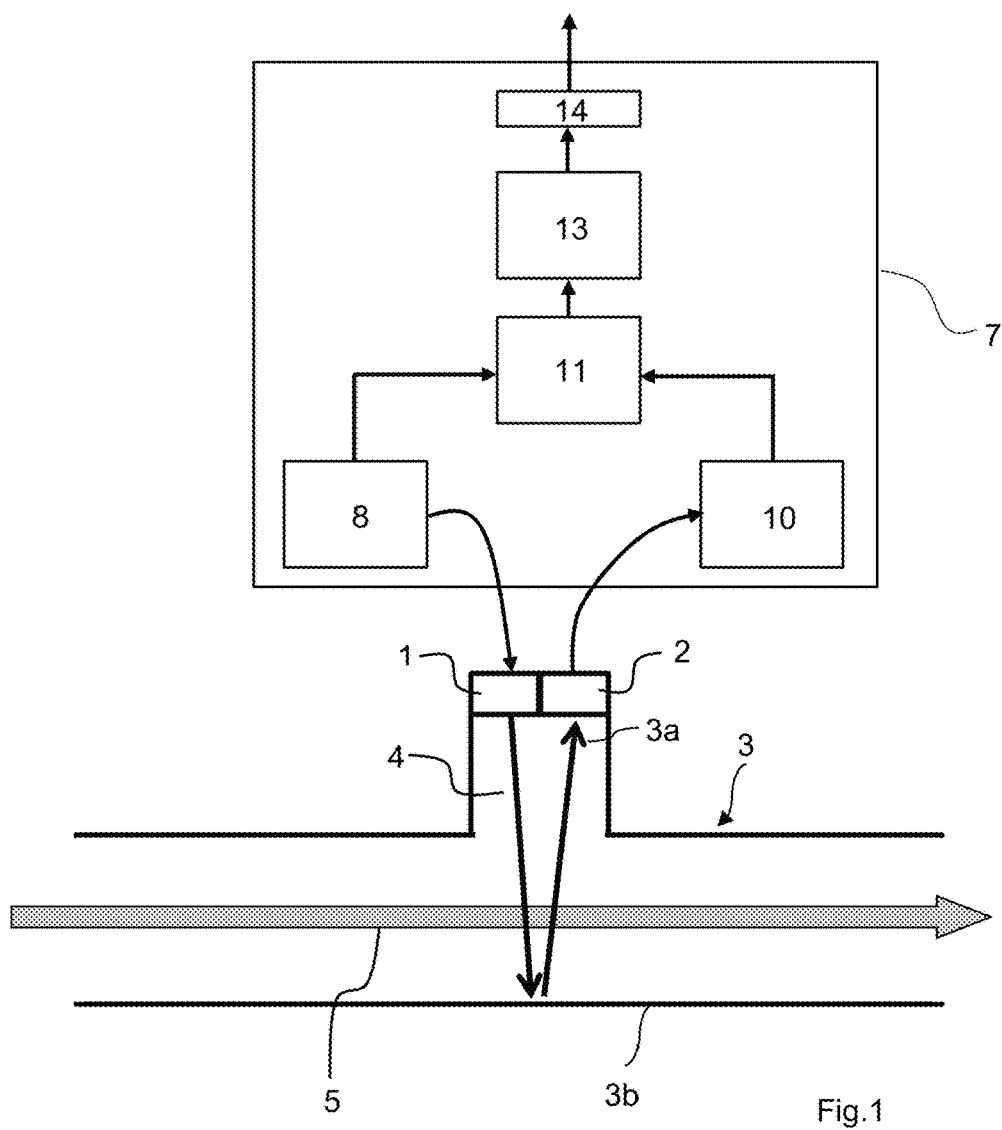
FIG. 1 a sensor arrangement in an exhaust gas pipe having sender and receiver on the same side of the gas pipe together with a block diagram of a signal processing unit comprising a signal processing means, FIG. 2 another sensor arrangement with one sender and one receiver on different sides of the gas pipe, FIG. 3 a sensor arrangement in an exhaust gas pipe having a sender and two receivers on the same side of the gas pipe together with a block diagram of a signal processing unit comprising the signal processing means, FIG. 4 another sensor arrangement in an exhaust gas pipe according to the principle of FIG. 3 having sender and receivers on the opposite sides of the gas pipe.

In the following description of the figures the reference numerals of the same parts in the different figures have the same numerals. The embodiments of the different arrangements all can be used for detecting misfire and, if required, additionally the temperature of the gas in an exhaust gas pipe of an internal combustion machine.

FIG. 1 shows a misfire detection arrangement comprising a sound sender 1, which is in this example an ultrasonic sound sender, and a respective sound receiver 2 both arranged in a recess 3a of an exhaust gas pipe 3. The propagation 4 of the sound from the sender 1 to the receiver 2 is via the wall 3b of the exhaust gas pipe 3 as a reflector of sound. The propagation of the exhaust gas is depicted with numeral 5.

Sender 1 and receiver 2 are connected to a signal processing unit 7 which comprises a sound function generator 8, which in this case is capable to provide ultrasound and is connected with the sender 1. The signal processing unit 7 further comprises a pre-amplifier/AD converter 10 connected with the receiver 2. The sound function generator 8 and the pre-amplifier/AD converter 10 are all connected with a lock-in amplifier 11 which is connected with a microprocessor 13, which controls the function of the total sensor arrangement. The lock-in amplifier 11 provides a signal indicating the phase angle between the signal provided by the receiver 2 and a reference signal provided by the sound function generator 8 to the lock-in amplifier 11. Number 14 indicates the output of the result for further processing the detection of misfire. In another advantageous embodiment, the lock-in amplifier 11 can be integrated digitally within the microprocessor 13.

Figure 2:
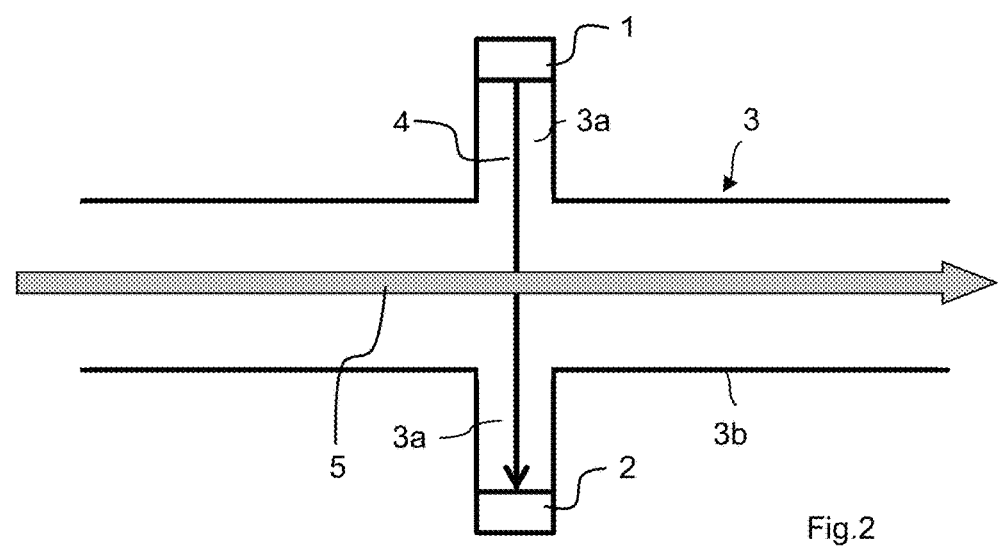

FIG. 2 shows only another arrangement of the sender 1 and the receiver 2 which are arranged on opposite sides of exhaust the gas pipe 3. The sender 1 as well as the receiver 2 are arranged in different recesses 3a. The sender 1 and the receiver 2 are connected to the signal processing unit 7 in the same way as shown in FIG. 1.

Figure 3:
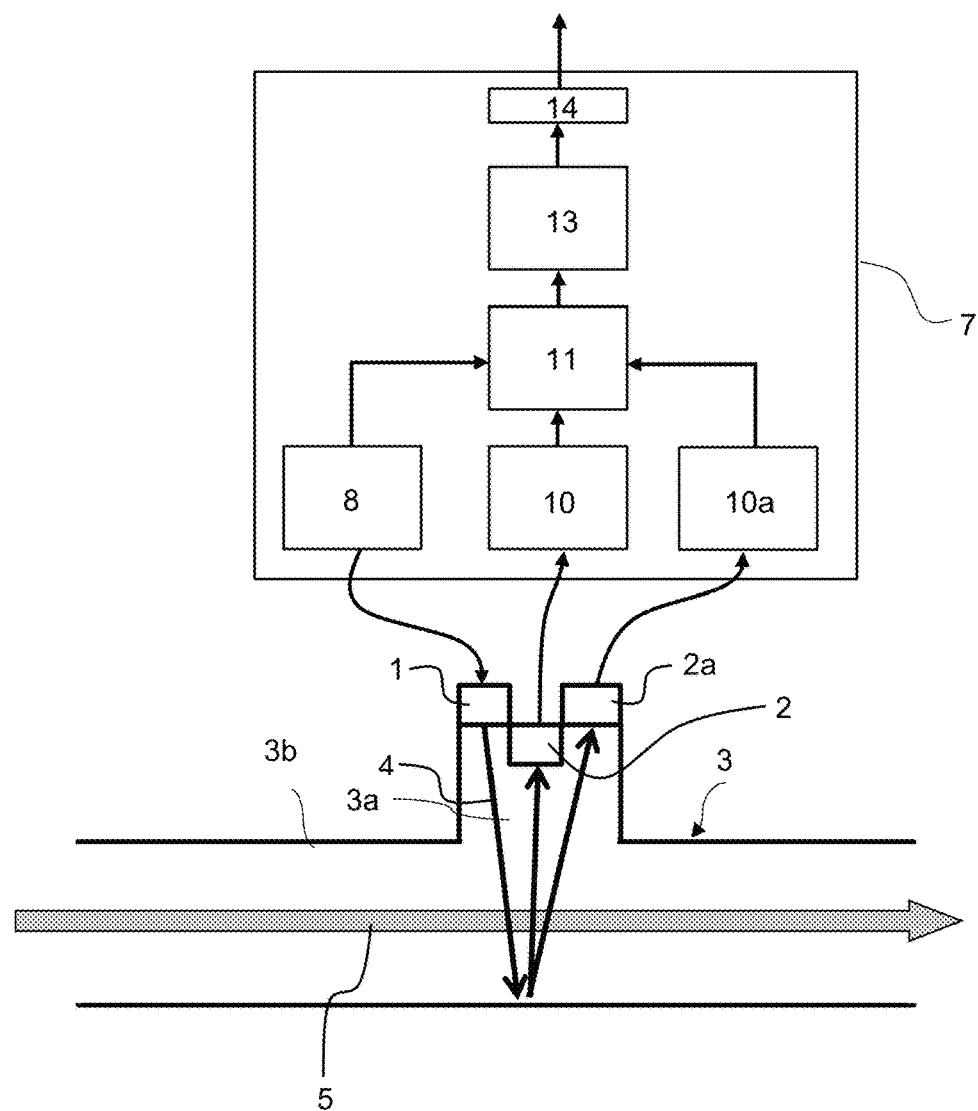

FIG. 3 shows a similar arrangement as in FIG. 1, however with a first receiver 2 and a second receiver 2a. As shown in the figure, the receivers 2, 2a are arranged close together but offset to each other. In view of that, the propagation of sound depicted with numeral 4 excited by the sender 1 and reflected at the wall 3b of the exhaust gas pipe 3 reaches the receivers 2, 2a along nearly the same measuring working section but with different path lengths. The two receivers 2, 2a thus have different distances for the propagation of sound 4.

Sender 1 and the two receivers 2, 2a are connected to a signal processing unit 7 which comprises a sound function generator 8, which in this case is capable to provide ultrasound and is connected with the sender 1. The signal processing unit 7 further comprises a first pre-amplifier/AD converter 10 connected with the first receiver 2 and a second pre-amplifier/AD converter 10a connected with the second receiver 2a. The sound function generator 8 and the two pre-amplifier/AD converters 10, 10a are all connected with a lock-in amplifier 11 which is connected with a microprocessor 13, which controls the function of the total sensor arrangement. The lock-in amplifier 11 provides a signal indicating the phase angle between the signals provided by the first receiver 2 and the second receiver 2a, which has to be compared with a given threshold phase value indicating whether the ignition is correct or presents a misfire. Number 14 indicates the output of the result for further processing the detection of misfire. In another advantageous embodiment, the lock-in amplifier 11 can be integrated digitally within the microprocessor 13.

Figure 4:
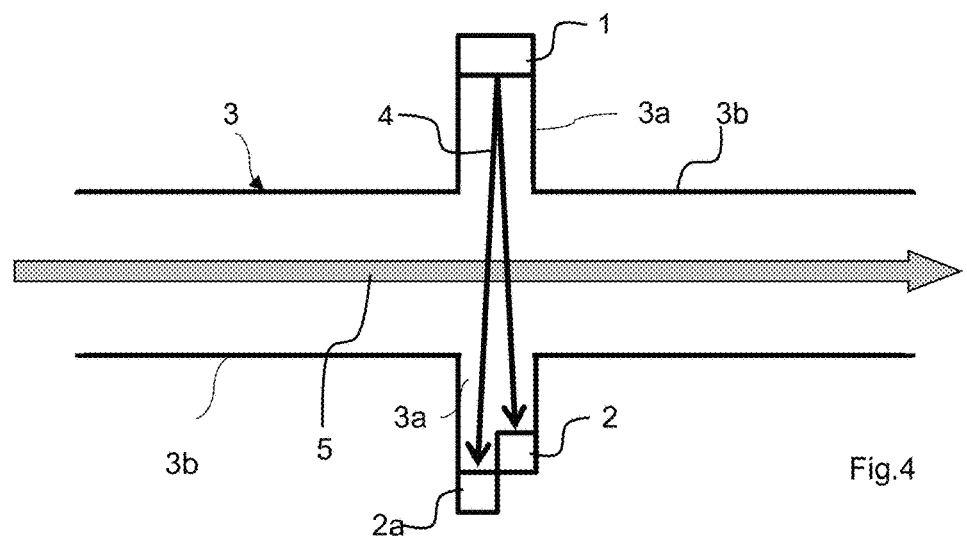

FIG. 4 shows another arrangement of the sender 1 and the first receiver 2 and the second receiver 2a, which are both arranged opposite to the sender 1 on the other side of exhaust the gas pipe 3. The sender 1 as well as the receivers 2, 2a are arranged in different recesses 3a. The receivers 2, 2a here also are arranged such that the distance between the sender 1 and the two receivers 2, 2a is different. The sender 1 and the receivers 2, 2a are connected to the signal processing unit 7 in the same way as shown in FIG. 3.

Figure 5:
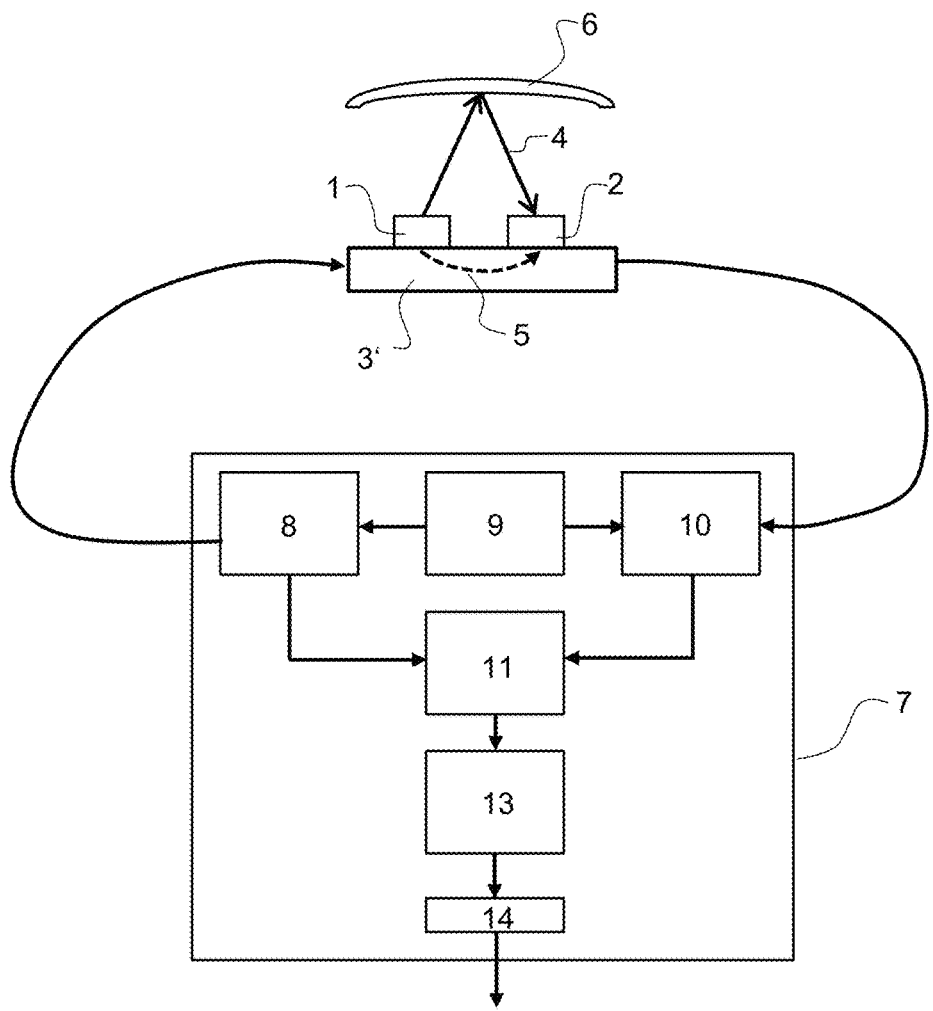
FIG. 5 a principle depiction of a sensor arrangement comprising a sender and a receiver on a common structure and reflection means arranged apart from the sender and the receiver such that the sound excited by the sender travels via the reflection means to the receiver through the gas for providing a gas-borne signal, together with a block diagram of a signal processing unit comprising signal processing means, and FIG. 6 a diagram of the cycle times of the sender and the receiver with different receiver cycle times.

FIG. 5 shows a mounting structure 3' (which can be included in the wall 3 of an exhaust pipe) with a sender 1 and a receiver 2 mounted on that structure 3'. Sender 1 and receiver 2 are mounted such that the sound propagation 4 from the sender 1 to the sender 2 travels via an acoustic reflector 6, which corresponds with the wall 3b of the FIGS. 1 to 4, before reaching the sender 2. That sound provides a gas-borne signal. The sound propagation 5 of the sound provided by the sender 1 also travels via the structure 3' to the receiver 2 thereby providing a structure-borne signal. The difference between the sender 1 and receiver 2 in the arrangement according to FIG. 1 is in their distance being less than 10 mm, preferably on the order of 4 mm. It is important that the time which the sound needs from the sender 1 to the receiver 2 via the different media (gas or solid material) is significant different in order to determine the speed of sound after processing the received signals with a sufficient accuracy.

A signal processing unit 7 which comprises a sound function generator 8, which in this embodiment provides an ultrasound, is connected with the sender 1. The receiver 2 is connected with a receiver pre-amplifier/AD-converter 10 of the signal processing unit 7. The signal processing unit 7 also comprises a switching function generator 9 which controls the sound function generator 8 or the receiver pre-amplifier/AD-converter 10 in view of their duty cycle. The sound function generator 8 is connected with a lock-in amplifier 11 as well as the receiver pre-amplifier/AD-converter 10. The sound function generator 8 provides the lock-in amplifier 11 with a respective reference signal. The lock-in amplifier 11 determines the phase angle between the reference signal delivered from the sound function generator 8 and the receiver signal from the receiver pre-amplifier/AD-converter 10. A microprocessor 13 receives the output signal from the lock-in amplifier 11 and provides a value output 14 in form of a respective signal for further processing as already explained in connection with the signal processing unit 7 in the other figures. In another advantageous embodiment, the lock-in amplifier 11 can be integrated digitally within the microprocessor 13.

In an exemplary embodiment, the sender 1 and the receiver 2 as shown in FIG. 1 are mounted very closely (distance of 4 mm) in parallel on the structure 3' made of steel. The sound of speed in steel is approximately 4'000 m/s, which means that any structure-borne sound takes 1 µs to travel from the sender to the receiver.

Through the gas, the sound will travel via the acoustical reflector 6 and a total distance of 40 mm. With a sound of speed in the gas on the order of 400 m/s, the gas-borne sound takes 100 µs to travel from the sender 1 to the receiver 2.

Figure 6:
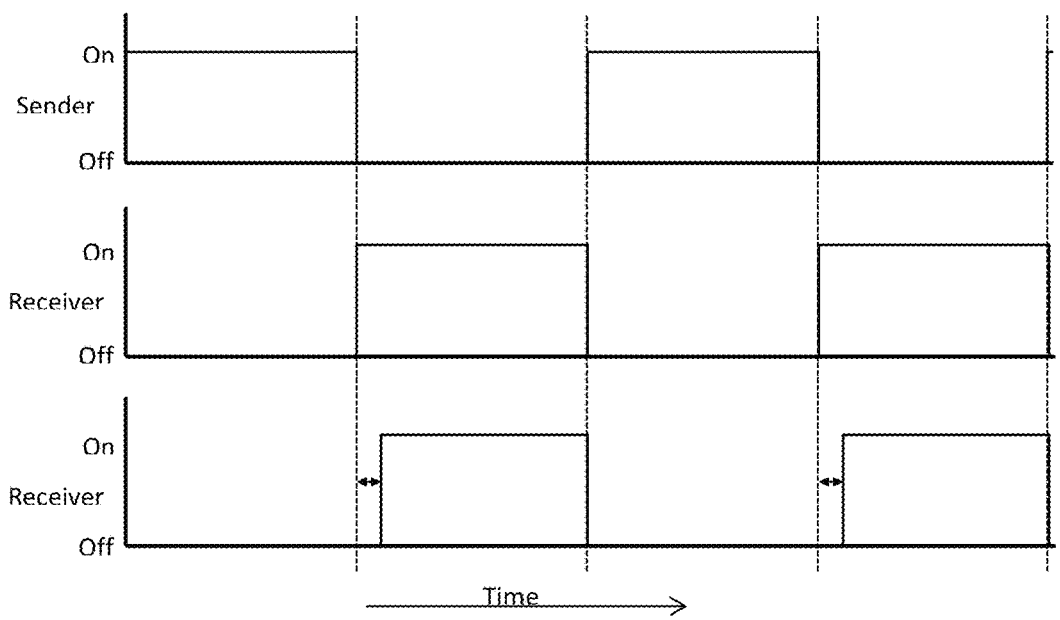

Both contributions can therefore be separated in time as shown in FIG. 6. In that figure the first diagram shows the duty times of the sender 1 over time. The second and middle diagram shows the duty time of the receiver 2 without delay in in respect to the "on"-status of the sender 1, whereas in the third and lowest diagram the duty time of the receiver 2 is delayed in respect to the shut-off of the sender 1. In the above example with the mentioned dimensions and material, the sender 1 is operated during 100 µs, while the input from the receiver 2 to the amplifier 10 is switched off. During the next 100 µs, the sender 1 is switched off while the signal of the receiver 2 is measured by the amplifier 10. As the last structure-borne sound will reach the receiver 2 1 µs after the sender 1 has been switched off, the structure-borne contribution to the receiver signal has been reduced to 1%, if both contributions have the same amplitude. The structure-borne contribution can be reduced further by introducing a delay of some few microseconds between switching off the sender 1, and switching on the receiver 2 as shown in the lowest diagram of FIG. 6. Such a delay might be necessary, if internal reflections of the sound within the structure 3' delay the transition time of the structure-borne sound.

As the overall noise level of the measurement strongly depends on over how many signal oscillations the amplifier can integrate, the « on » time of the receiver 2 should correspond to the time of travel of the gas-borne sound. For the same reason, the « on » time of the sender 1 should span the same amount of time, so that the duty cycles of sender 1 and receiver 2 are both 50% with a phase shift of π.

At an operational frequency of 50 kHz, the amplifier 11 will therefore integrate the receiver's signal over 5 periods. However, with a lock-in amplifier 11 as used it is possible to integrate the receiver signal continuously over extended periods of time. The amplitude measured by the lock-in amplifier 11 will be half of a continuous signal, whereas the phase angle information is entirely maintained. In this case, the function generator 8 driving the sender 1 must supply a reference signal to the lock-in amplifier 11 all the time.

The invention claimed is:

1. A method for detection of a misfire of an internal combustion engine, by measuring a speed of sound variations of an exhaust gas in an exhaust gas pipe of the engine as a function of time, comprising
   providing sound sending means and sound receiving means,
   placing the sound sending means and the sound receiving means on one side of the pipe,
   determining the speed of sound from the sending means travelling twice across the pipe before reaching the receiving means,
   providing a structure having a speed of sound which is higher than the speed of sound in the gas, arranging a sender as the sound sending means and at least one receiver as the sound receiving means on the structure, operating the sender during a least one period of time in an "on"-status by sending an acoustical signal, and during at least one period of time in an "off"-status without sending an acoustical signal, operating the at least one receiver in an "off"-status during the at least one period of time of the "on"-status of the sender, and in an "on"-status during the at least one period of time of the "off"-status of the sender.

2. The method according to claim 1, wherein the sound used for measurement is an ultrasonic sound.

3. The method according to claim 1, comprising measuring a phase angle of the sound between the sending means and the receiving means.

4. The method according to claim 3, wherein the at least one receiver includes a first receiver and a second receiver, which are arranged such that the travel distance of the sound provided by the sender to the first receiver is different from the travel distance of the sound provided by the sender to the second receiver.

5. The method according to claim 4, comprising arranging the second receiver near the first receiver in the same direction from the sender thereby providing in general only one measuring section of the sound excited by the sender.

6. The method according to claim 1, wherein a misfiring is determined as the speed of sound during the exhaust cycle being below a defined threshold value and/or having a correct timing.

7. The method according to claim 1, comprising determining misfiring as a change of the speed of sound in the exhaust gas in dependence of time and then determining a temperature of the exhaust gas using the same signals.

8. A sensor arrangement adapted to detect misfire of an internal combustion engine, by measuring a speed of sound variations of an exhaust gas in an exhaust gas pipe of the engine as a function of time, comprising:

sound sending means and sound receiving means arranged all on one side of the exhaust pipe, and a signal processing means adapted to determine the speed of sound from the sending means traveling twice across the pipe before reaching the receiving means, and adapted to detect misfiring depending on whether the speed of sound during the exhaust cycle is below a defined threshold value and/or has a correct timing, wherein the sound sending means comprises a sound sender and the sound receiving means comprises at least one sound receiver, wherein the sound sender and the at least one sound receiver are both mounted on a common structure, wherein the signal processing means is configured to:
(i) operate the sender during a least one period of time in an "on"-status by sending an acoustical signal, and during at least one period of time in an "off"-status without sending an acoustical signal,
(ii) operate the at least one receiver in an "off"-status during the at least one period of time of the "on"-status of the sender, and in an "on"-status during the at least one period of time of the "off"-status of the sender,
(iii) integrate the signal of the at least one receiver, and
(iv) calculate the speed of sound.

9. The sensor arrangement according to claim 8, wherein the at least one receiver includes a first receiver and a second receiver, which are arranged such that the travel distance of the sound provided by the sender to the receivers is different to each of the at least first receiver and second receiver.

10. The sensor arrangement according to claim 9, wherein the second receiver is arranged near the first receiver in the same direction from the sender thereby providing in general only one measuring working section of the sound excited by the sender.

11. The sensor arrangement according to claim 8, wherein the signal processing means is configured to determine delay or premature of firing events in the internal combustion engine from a phase angle of signals of the sound receiving means.

12. The sensor arrangement according to claim 8, wherein the signal processing means additionally average a phase angle of signals of the sound receiving means and calculate an exhaust gas temperature.

* * * * *